United States Patent
Das et al.

(10) Patent No.: US 9,952,956 B2
(45) Date of Patent: Apr. 24, 2018

(54) CALCULATING THE CLOCK FREQUENCY OF A PROCESSOR

(71) Applicant: INTERNATIONAL BUSINESS MACHINES CORPORATION, Armonk, NY (US)

(72) Inventors: Rajarshi Das, Bangalore (IN); Philip L Vitale, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 120 days.

(21) Appl. No.: 14/792,593

(22) Filed: Jul. 6, 2015

(65) Prior Publication Data

US 2017/0010627 A1    Jan. 12, 2017

(51) Int. Cl.
*G06F 11/30* (2006.01)
*G06F 9/48* (2006.01)
(Continued)

(52) U.S. Cl.
CPC .......... *G06F 11/3051* (2013.01); *G06F 1/04* (2013.01); *G06F 1/08* (2013.01); *G06F 9/4881* (2013.01); *G06F 11/34* (2013.01)

(58) Field of Classification Search
CPC ... G06F 1/08; G06F 11/34; G06F 1/04; G06F 9/4881; H04L 12/2602; H04L 65/80; H04L 21/25808
See application file for complete search history.

(56) References Cited

U.S. PATENT DOCUMENTS

| 4,658,406 A | 4/1987 | Pappas |
| 5,874,846 A | 2/1999 | Lee |

(Continued)

FOREIGN PATENT DOCUMENTS

| CN | 202815089 | 3/2013 |
| EP | 0425080 A1 | 5/1991 |

(Continued)

OTHER PUBLICATIONS

Lennart Johnsson, "Future High Performance Computation: The Megaflop per Dollar Alternative," Research Report, Yale University, YALEU/DCS/RR-360, Jan. 1985.
(Continued)

*Primary Examiner* — Terrell Johnson
(74) *Attorney, Agent, or Firm* — Kunzler, PC (57) ABSTRACT

Apparatuses, methods, systems, and computer program products are disclosed for calculating a clock rate of a processor. A baseline data module receives a first set of performance data associated with a processor. The performance data is generated using a hardware element that captures performance data for the processor. The hardware element is external to the processor. An update data module receives a second set of performance data associated with the processor a predefined time interval after the first set of performance data is received. The second set of performance data corresponds to the first set of performance data. A rate module calculates a clock rate for the processor based on the first set of performance data and the second set of performance data.

20 Claims, 6 Drawing Sheets

(51) Int. Cl.
*G06F 1/08* (2006.01)
*G06F 1/04* (2006.01)
*G06F 11/34* (2006.01)

(56) References Cited

U.S. PATENT DOCUMENTS

| | | | |
|---|---|---|---|
| 6,266,625 | B1 | 7/2001 | Johnson |
| 6,895,520 | B1 | 5/2005 | Altmejd et al. |
| 6,985,547 | B2 | 1/2006 | Uht |
| 7,155,617 | B2 | 12/2006 | Gary et al. |
| 7,170,808 | B2 | 1/2007 | Hokenmaier |
| 7,290,120 | B2 | 10/2007 | DiGregorio |
| 7,805,577 | B1 | 9/2010 | Mattina et al. |
| 7,895,457 | B2 | 2/2011 | Luo et al. |
| 8,310,395 | B2 | 11/2012 | Oehler |
| 8,423,987 | B2 | 4/2013 | Archer et al. |
| 8,624,632 | B2 | 1/2014 | Bulzacchelli |
| 2007/0093986 | A1* | 4/2007 | Armstead ........... G06F 11/3414 702/182 |
| 2009/0030942 | A1* | 1/2009 | Jiang ............... H04L 43/00 |
| 2011/0154089 | A1* | 6/2011 | Wolfe ............... G06F 1/08 713/501 |
| 2012/0207248 | A1 | 8/2012 | Ahmed et al. |
| 2013/0077642 | A1 | 3/2013 | Webb, III et al. |

FOREIGN PATENT DOCUMENTS

| | | |
|---|---|---|
| WO | 1995035540 A1 | 6/1995 |
| WO | 2006101357 A1 | 9/2006 |
| WO | 2013015819 A1 | 10/2013 |

OTHER PUBLICATIONS

Li, Jian and Martinez, Jose F., "Dynamic Power-Performance Adaptation of Parallel Computation on Chip Multiprocessors," Presentation Outline, ftp://kazecki.com/school/mk_569_presentation_final.pdf, Last visited Jul. 6, 2015.

Li, Jian and Martinez, Jose F., "Dynamic Power-Performance Adaptation of Parallel Computation on Chip Multiprocessors," Computer Systems Laboratory, Cornell University, IEEE 2006.

J. C. Bienfang, et al., "Quantum key distribution with 1.25 Gbps clock synchronization," Opt. Express 12, 2011-2016 (2004).

* cited by examiner

CALCULATING THE CLOCK FREQUENCY OF A PROCESSOR

FIELD

The subject matter disclosed herein relates to computer processors and more particularly relates to calculating the clock rate of a computer processor.

BACKGROUND

The clock rate of a processor can vary dynamically while a computing device is powered on, which allows the processor to conserve power. For example, the clock rate can vary from −50% to +20% from a baseline or nominal clock rate in response to workload characteristics and/or measurements from the processor's physical environment. The variation in clock rate is typically performed asynchronously such that an operating system or hypervisor is not aware that the clock rate has changed. The efficient and accurate assessment of the clock rate, however, is fundamental to interpreting performance metrics that are associated with the processor and one or more workload partitions on a computing system.

BRIEF SUMMARY

An apparatus for calculating the clock rate of a processor is disclosed. A method and computer program product also perform the functions of the apparatus. In one embodiment, an apparatus includes a baseline data module that receives a first set of performance data associated with a processor. The performance data may be generated using a hardware element that captures performance data for the processor. The hardware element is external to the processor. In another embodiment, the apparatus includes an update data module that receives a second set of performance data associated with the processor a predefined time interval after the first set of performance data is received. The second set of performance data may correspond to the first set of performance data. The apparatus, in a further embodiment, includes a rate module that calculates a clock rate for the processor based on the first set of performance data and the second set of performance data.

In a certain embodiment, the first and second sets of performance data include counts for a plurality of different events associated with the processor. In some embodiments, the plurality of different events are divided into a plurality of groups of events for each of the first and second sets of performance data. The apparatus, in various embodiments, includes a group module that determines one or more groups that include one or more events associated with calculating the clock rate of the processor.

In some embodiments, the apparatus includes a delta module that determines a difference between the performance data counts between the first set and the second set of performance data for a plurality of events. The plurality of events may include an event for a count of a number of processor clock cycles and an event for a count of a number of completed cycles at a fixed frequency clock rate. The event for the number of processor clock cycles may be in a first event group and the event for the count for a number of completed cycles at a fixed frequency clock rate may be in a second event group.

The apparatus, in another embodiment, includes a baseline interval module that determines a first delta measurement period interval as a function of a first measurement period interval for the first event group and a second delta measurement period interval as a function of a second measurement period interval for the second event group. The apparatus, in a further embodiment, includes a baseline cycle timing module that determines a time to complete the number of completed cycles at a fixed frequency clock rate as a function of the number of completed cycles at a fixed frequency clock rate and a time to complete one cycle at the fixed frequency clock rate.

The apparatus, in various embodiments, includes an update interval module that determines a time to update the second delta measurement period interval by one as a function of the time to complete the number of completed cycles at a fixed frequency clock rate and the second delta measurement period interval. In a further embodiment, the apparatus includes a clock module that determines a measurement period interval clock by inverting the time to update the second delta measurement period interval by one. In yet another embodiment, the apparatus includes an update cycle timing module that determines a time to count the number of processor clock cycles as a function of the measurement period interval clock and the first delta measurement period interval. In some embodiments, the apparatus includes a frequency module that determines the clock rate for the processor as a function of the number of processor clock cycles and the time to count the number of processor clock cycles.

In one embodiment, the performance data for each group of the plurality of groups is captured by the hardware element at predetermined time intervals, the predetermined time intervals being at least on the order of microseconds. In a further embodiment, the predetermined time intervals are at least 256 microseconds. In some embodiments, the update data module receives a third set of performance data associated with the processor a predefined time interval after the second set of performance data is received. The third set of performance data may correspond to the second set of performance data. In one embodiment, the rate module calculates a second clock rate for the processor based on the second set of performance data and the third set of performance data.

In some embodiments, the performance data is captured by the hardware element without intervention by a software application. In a further embodiment, the apparatus includes a read module that reads the performance data associated with the processor from a memory table external to the processor. In various embodiments, the read module reads the performance data from the memory table using a hypervisor interface. The hypervisor interface may be associated with a logical partition executing on a computing device. In one embodiment, the computing device includes a plurality of logical partitions. Each logical partition may include a separate memory table that stores performance data associated with the logical partition.

A method, in one embodiment, includes receiving a first set of performance data associated with a processor. The performance data may be generated using a hardware element that captures performance data for the processor. The hardware element is external to the processor. In a further embodiment, the method includes receiving a second set of performance data associated with the processor a predefined time interval after the first set of performance data is received. The second set of performance data may correspond to the first set of performance data. The method, in another embodiment, includes calculating a clock rate for the processor based on the first set of performance data and the second set of performance data.

In one embodiment, the first and second sets of performance data include counts for a plurality of different events associated with the processor. The plurality of different events may be divided into a plurality of groups of events for each of the first and second sets of performance data. In a further embodiment, the method includes determining one or more groups that include one or more events associated with calculating the clock rate of the processor.

In one embodiment, the method includes determining a difference between the performance data counts between the first set and the second set of performance data for a plurality of events. The plurality of events may include an event for a count of a number of processor clock cycles and an event for a count of a number of completed cycles at a fixed frequency clock rate. The event for the number of processor clock cycles may be in a first event group and the event for the count for a number of completed cycles at a fixed frequency clock rate may be in a second event group.

The method, in another embodiment, includes determining a first delta measurement period interval as a function of a first measurement period interval for the first event group and a second delta measurement period interval as a function of a second measurement period interval for the second event group. In some embodiments, the method includes determining a time to complete the number of completed cycles at a fixed frequency clock rate as a function of the number of completed cycles at a fixed frequency clock rate and a time to complete one cycle at the fixed frequency clock rate. In a further embodiment, the method includes determining a time to update the second delta measurement period interval by one as a function of the time to complete the number of completed cycles at a fixed frequency clock rate and the second delta measurement period interval.

In some embodiments, the method includes determining a measurement period interval clock by inverting the time to update the second delta measurement period interval by one. In one embodiment, the method includes determining a time to count the number of processor clock cycles as a function of the measurement period interval clock and the first delta measurement period interval. In yet another embodiment, the method includes determining the clock rate for the processor as a function of the number of processor clock cycles and the time to count the number of processor clock cycles.

In one embodiment, the performance data for each group of the plurality of groups is captured by the hardware element at predetermined time intervals. The predetermined time intervals may be at least 256 microseconds. In a further embodiment, the performance data is captured by the hardware element without intervention by a software application. In another embodiment, the method includes reading performance data associated with the processor from a memory table external to the processor using a hypervisor interface. The hypervisor interface may be associated with a logical partition executing on a computing device.

A computer program product, in one embodiment, includes a computer readable storage medium having program instructions embodied therewith. The program instructions may be readable/executable by a processor to cause the processor to receive, by processor, a first set of performance data associated with the processor. The performance data may be generated using a hardware element that captures performance data for the processor. The hardware element may be external to the processor. In another embodiment, the program instructions readable/executable by a processor to cause the processor to receive, by processor, a second set of performance data associated with the processor a predefined time interval after the first set of performance data is received. The second set of performance data may correspond to the first set of performance data. In a further embodiment, the program instructions readable/executable by a processor to cause the processor to calculate, by processor, a clock rate for the processor based on the first set of performance data and the second set of performance data.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

Figure 1:
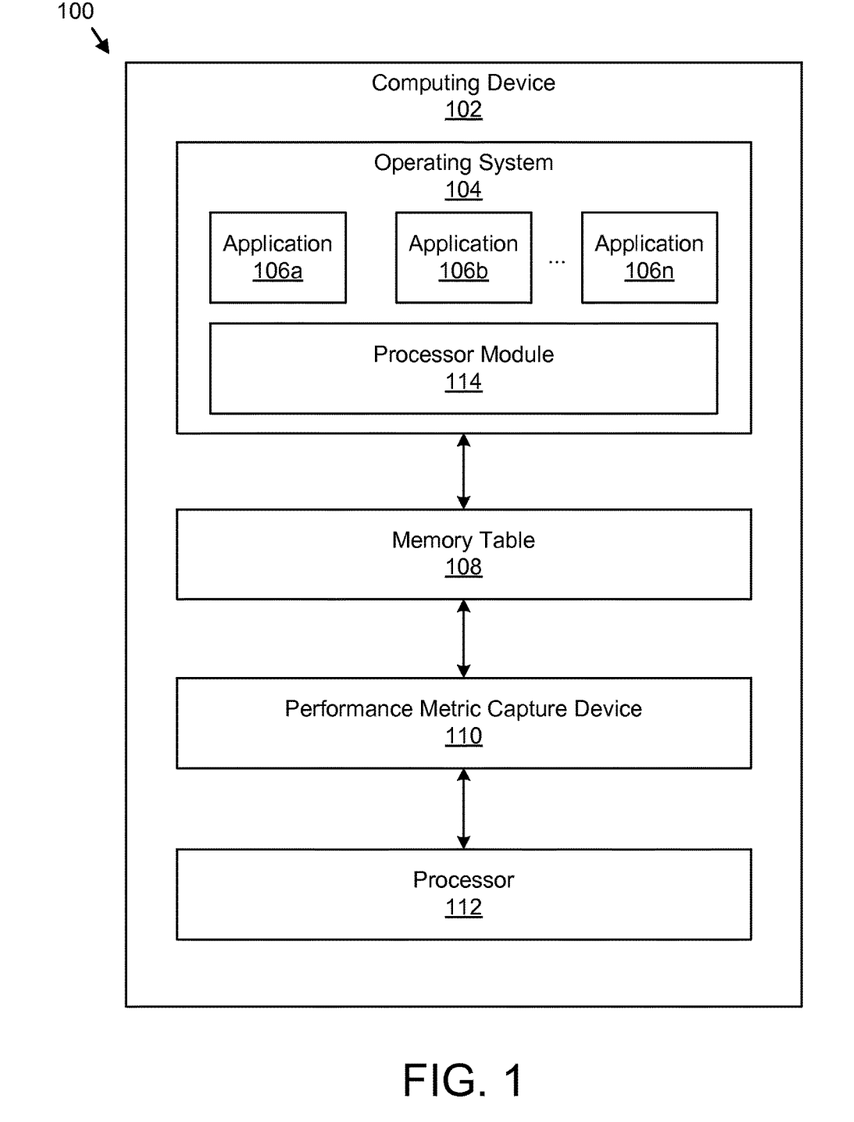
FIG. 1 is a schematic block diagram illustrating one embodiment of a system for calculating a clock frequency of a processor.

FIG. 1 depicts one embodiment of a system 100 for calculating a clock frequency of a processor 112. In one embodiment, the system 100 includes a computing device 102, which may include an operating system 104, one or more applications 106a-n, and a processor module 114. The computing device 102, in further embodiments, includes a memory table 108, a performance metric capture device 110, and a processor 112.

In one embodiment, the computing device 102 includes a desktop computer, a laptop computer, a workstation, or the like. In certain embodiments, the computing device includes handheld, mobile, or wearable devices, such as smart phones, tablet computers, smart watches, optical head-mounted displays, or the like. In one embodiment, the computing device 102 includes a server. The server may be configured as a database server, a file server, a mail server, a print server, a web server, a gaming server, an application server, or the like. In some embodiments, the computing device 102 is a networked computing device 102, such as a network server, that is remotely accessible via the internet (e.g., the cloud), an intranet, or the like. The computing device 102 may also include set-top boxes, gaming consoles, digital video recorders, or the like.

As is known in the art, the operating system 104 may be software that manages hardware and software resources and provides common services for computer programs executing on the computing device 102. The operating system 104 may include Microsoft Windows®, OS X®, a Linux®- or Unix®-based operating system or the like. The operating system 104 may include operating systems developed for mobile devices, such as Apple iOS®, Google Android®, Windows Mobile®, Symbian®, WebOS®, or the like.

The one or more applications 106a-n, in one embodiment, include software applications that are configured to execute on the computing device 102 within the operating system 104 environment. The applications 106a-n may include email applications, productivity applications, database applications, gaming applications, web browser applications, multimedia applications, multimedia editing applications, or the like. In general, when the applications 106a-n are executed, the applications 106a-n consume a number of processor clock cycles to execute. Each application 106a-n may consume processor clock cycles at different rates.

The memory table 108, in one embodiment, is located on a portion of memory located on the computing device 102, such as a portion of RAM, a portion of a cache, a portion of a register, a portion of a non-volatile storage device, or the like. The memory table 108, in certain embodiments, is configured to store performance data associated with the processor 112. In some embodiments, the performance data is captured or generated by the performance metric capture device 110, described below, and stored in the memory table 108.

In one embodiment, the computing device 102 includes a plurality of memory tables 108 that are configured to store performance data associated with the processor 112 and the overall performance of the computing device 102, the operating system 104, each application 106a-n, or a combination of the foregoing. For example, the computing device 102 may maintain a memory table 108 that stores performance data for the operating system 104, another memory table 108 that stores performance data for an application 106a, a memory table 108 that stores performance data for the computing device 102, a memory table 108 that stores performance data for a processor 112 or a processor core, or the like.

The performance metric capture device 110, in one embodiment, is configured to track, capture, generate, or otherwise collect performance data as it is related to the processor 112. As used herein, performance data may include data associated with the processor 112 that includes one or more characteristics, metrics, or the like that describes the performance of the processor 112. In certain embodiments, the performance metric capture device 110 stores performance data in one or more fixed and/or configurable counters associated with the memory table 108. As used herein, counters may track or provide useful information about the workload of the processor 112. The performance metric capture device 110 may maintain a plurality of counters that describe the performance of a processor 112, an operating system 104, an application 106a-n, or the like. For example, the counters may include counters for various processor-related events for a period of time such as the average rate per second at which context switches among threads on the computer, the percentage of time the processor 112 was busy servicing a specific process, the number of processor cycles, the number of 32 MHz processor cycles, or the like.

In certain embodiments, the performance metric capture device 110 is embodied as a chip, die, die plane, or the like. The performance metric capture device 110, in one embodiment, is separate from or external to the processor 112. In another embodiment, the performance metric capture device 110 is integrated into the processor 112. The performance metric capture device 110 may be configured to generate, track, capture, or otherwise collect performance data associated with the processor 112 when the processor 112 is activated or powered on and continuously captures performance data while the processor 112 is active.

Furthermore, the performance metric capture device 110 captures performance data without being configured by a software application such as an operating system 104 and/or an application 106a-n executing on the computing device 102. In this manner, the processor 112 does not consume clock cycles processing configuration instructions from the operating system 104 and/or an application 106a-n to configure the performance metric capture device 110. Moreover, configuration errors and/or failures may be eliminated by not configuring the performance metric capture device 110 using a software application, which increases the reliability of the system.

In one embodiment, the performance metric capture device 110 captures, tracks, generates, or collects performance data at predefined or predetermined intervals. For example, performance metric capture device 110 may capture and store performance data in the memory table 108 every 256 microseconds, 512 microseconds, 1 millisecond, 500 milliseconds, 1 second, or the like. The performance metric capture device 110, in certain embodiments, stores performance data in the memory table 108 according to time-multiplexed groups of performance events. In one embodiment, performance data for processor events, such as the number of processor cycles or the number of 32 MHz processor cycles, may be divided into one or more groups of processor events. For example, there may be 128 different groups of processor events, with four processor events per group.

The performance data within each group may be time-multiplexed, meaning that the performance metric capture device 110 organizes the performance data in such a way that a full set of performance data for a group can be read during a predefined data read interval. For example, if the data read interval is one second, then a full set of performance data for a specific group can be read every one second. Furthermore, the performance metric capture device 110 organizes performance data stored in the memory table 108 by application 106a-n, application type, operating system 104, processor 112, processor core, logical partition, workload, or the like.

The processor 112, as is known in the art, is a processing unit of the computing device 102 that includes the electronic circuitry to carry out the instructions of a computer program, such as an operating system 104 or an application 106a-n, by performing the basic arithmetic, logic, control, and input/output (I/O) operations specified by the instructions. The processor 112 may execute one or more instructions during a processor clock cycle. As used herein, a processor clock cycle is an amount of time between two pulses of an oscillator, otherwise known as the clock frequency. The clock cycle can be used to determine a processor's speed, which is typically measured in Hertz (Hz). In general, the higher number of pulses per second, the faster the computer processor 112 will be able to process information in the form of instructions.

A processor 112 may include a plurality of processing cores—central processing units located on a single computing chip or die. The processor 112 may include physical cores, logical/virtual cores, or a combination of both. Moreover, the computing device 102 may include a plurality of processors 112. In certain embodiments, the performance metric capture device 110 organizes captured performance data by processor 112 and/or processor core. In some embodiments, the processor 112 may be a multithreaded POWER8® processor by IBM® of Armonk, N.Y.

The processor module 114, in one embodiment, is configured to determine the clock rate of the processor 112 using the performance data captured by the performance metric capture device 110. In one embodiment, the processor module 114 receives a first set of performance data associated with a processor 112 and a second set of performance data associated with the processor 112 a predefined time interval after the first set of performance data is received. In some embodiments, the second set of performance data corresponds to the first set of performance data. The processor module 114 then calculates the clock rate for the processor 112 based on the first set and second set of performance data. The processor module 114 is described in more detail below with reference to FIGS. 3 and 4.

Figure 2:
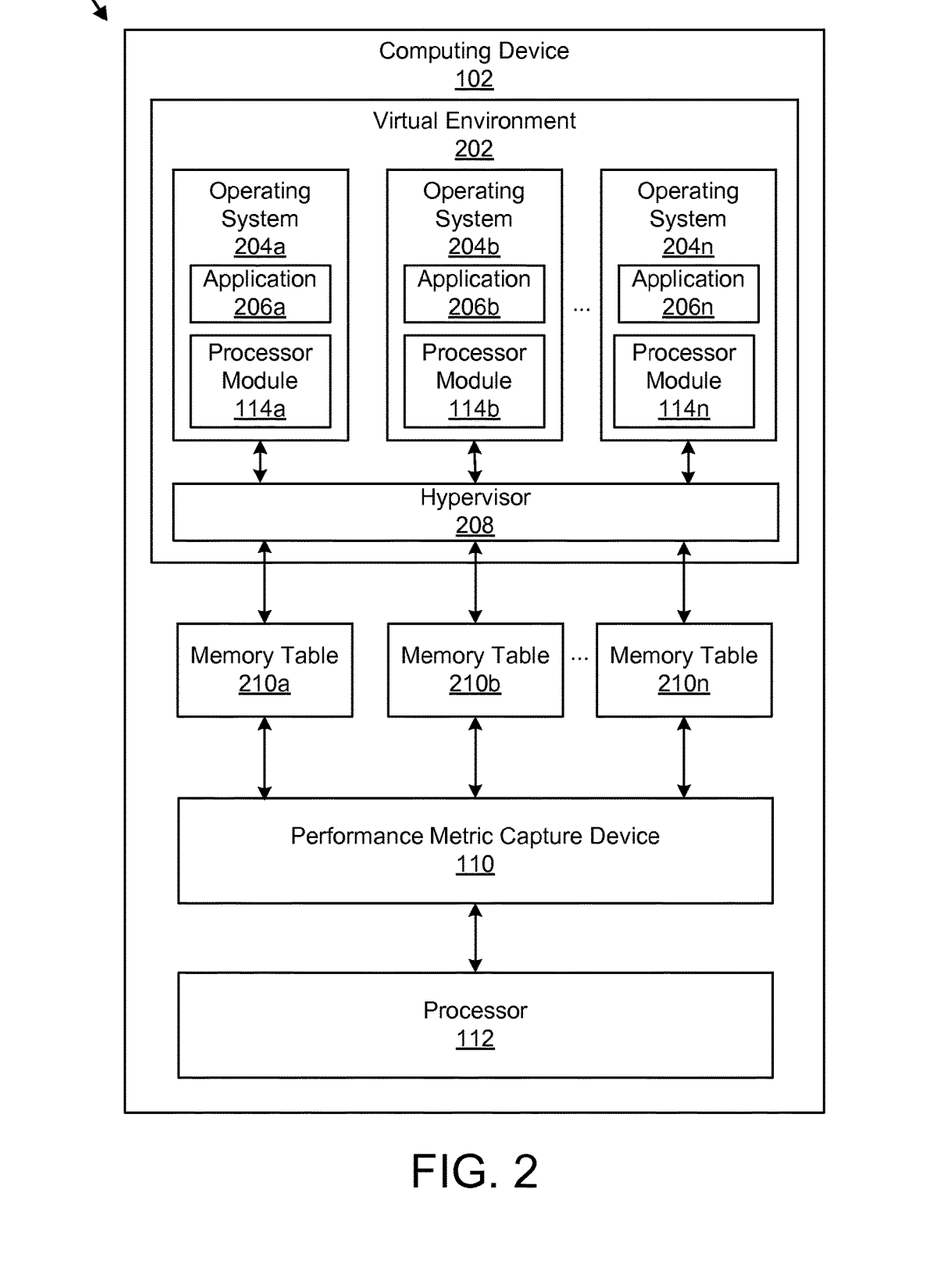
FIG. 2 is a schematic block diagram illustrating one embodiment of another system for calculating a clock frequency of a processor.

FIG. 2 depicts one embodiment of another system 200 for calculating a clock frequency of a processor 112. The depicted system 200 includes a computing device 102, a performance metric capture device 110, a processor 112, and one or more processor modules 114a-n, which may be substantially similar to the computing device 102, the performance metric capture device 110, the processor 112, and the processor module 114 illustrated and described with reference to FIG. 1. The system 200 depicted in FIG. 2 may also include a virtual environment 202, one or more operating systems 204a-n and applications 206a-n executing within the virtual environment 202, a hypervisor 208, and one or more memory tables 210a-n, which are described in more detail below.

The virtual environment 202, or virtual machine, may include software, systems, or programs that implement, manage, and/or control one or more guest operating systems 204a-n. For example, the virtual environment 202 may include a hypervisor 208 that one or more virtual instances, such as guest operating systems 204a-n, use to communicate with the physical hardware of the computing device 102. Examples may include Oracle VirtualBox®, Parallels®, VMWare®, and Windows VirtualPC®. In some embodiments, the virtual environment 202 is installed within the host or main operating system 104 of the computing device 102. In another embodiment, the virtual environment 202 is installed as a "bare-bones" installation on the computing device 102.

The one or more operating systems 204a-n may include guest operating systems 204a-n that execute within the virtual environment 202. As used herein, the guest operating system 204a-n is either installed as a virtual operating system or as a disk partition, and may execute in addition to a host or main operating system 104 of the computing device 102. The guest operating systems 204a-n may also be known as logical partitions executing on the computing device 102. The guest operating systems 204a-n may each be the same type or version of an operating system 104 or a various types or versions of operating systems 104. For example, one guest operating system 204a-n may be Windows 7®, another guest operating system 204a-n may be an Ubuntu® distribution of Linux®, and yet another guest operating system 204a-n may be OS X®.

Furthermore, the guest operating systems 204a-n may include different applications 206a-n that have been developed for the particular operating system type and version. For example, a Windows 8® guest operating system 204a-n may execute applications 206a-n that cannot run on a Linux® or OS X® guest operating system 204a-n. Thus, each guest operating system 204a-n, including the applications 206a-n that execute within each guest operating system 204a-n, are independent of one another.

The virtual environment 202 may also include a hypervisor 208, or virtual machine monitor ("VMM"). The hypervisor 208, as used herein, is a piece of computer software, firmware or hardware that creates and/or runs virtual machines and presents the guest operating systems 204a-n with a virtual operating platform and manages the execution of the guest operating systems 204a-n. As described above, multiple instances of a variety of operating systems 204a-n may share the virtualized hardware resources, which are managed by the hypervisor 208. The hypervisor 208 allows multiple guest operating systems 204a-n to share physical hardware resources of the computing device 102, such as the processor 112.

The hypervisor 208 may be in communication with one or more memory tables 210a-n that store performance data collected, tracked, generated, or otherwise captured by the performance metric capture device 110. Similar to the system 100 of FIG. 1, the performance metric capture device 110 captures performance data associated with the processor 112 and stores it in one or more memory tables 210a-n. The memory tables 210a-n may each be associated with a corresponding guest operating system 204a-n and/or one or more applications 206a-n executing within the guest operating systems 204a-n. Accordingly, the performance metric capture device 110 may capture performance data associated with the processor 112 and with a guest operating system 204a-n and/or one or more applications 206a-n executing within the guest operating systems 204a-n and store the data in the corresponding memory table 210a-n. In this manner, each guest operating system 204a-n or logical partition may receive its performance data from a memory table 210a-n specifically associated with the guest operating system 204a-n and not performance data associated with other guest operating systems 204a-n.

In some embodiments, when a new logical partition or guest operating system 204a-n is created, a new memory table 210a-n is instantiated such that performance data captured by the performance metric capture device 110 associated with the new guest operating system 204a-n can be stored in the memory table 210a-n for the new guest operating system 204a-n.

Figure 3:
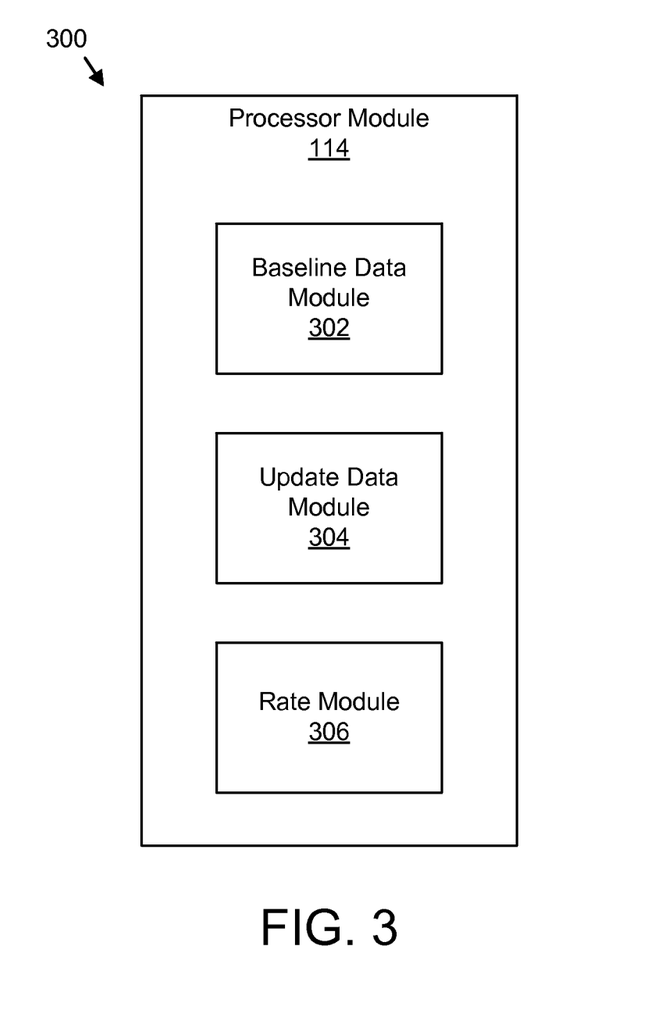
FIG. 3 is a schematic block diagram illustrating one embodiment of a module for calculating a clock frequency of a processor.

FIG. 3 depicts one embodiment of a module 300 for calculating a clock frequency of a processor 112. In one embodiment, the module 300 includes an instance of a processor module 114. The processor module 114 may include one or more of a baseline data module 302, an update data module 304, and a rate module 306, which are described in more detail below.

The baseline data module 302, in one embodiment, is configured to receive a first set of performance data associated with a processor 112. As described above, the performance data includes data associated with a processor 112 and an operating system 104, an application 106a-n, or a combination of operating systems 104 and applications 106a-n. The performance data may include data for different processor events, such an event for the number of processor clock cycles, an event for the percentage of time the processor 112 was busy, an event for the number of 32 MHz clock cycles, or the like. In certain embodiments, the performance data has been measured, generated, captured, collected, tracked, or the like by the performance metric capture device 110 at predetermined intervals. The predetermined intervals may be at least on the order of microseconds, but the performance metric capture device 110 may collect performance data at nanosecond intervals, millisecond intervals, second intervals, or the like.

In some embodiments, the baseline data module 302 receives the performance data organized in one or more groups of performance events. In one embodiment, a group of events include performance data for events that measure similar performance characteristics. For example, Group 0 may include performance data for events associated with measuring clock cycle performance and Group 1 may include performance data for events associated with measuring the performance of one or more threads, and so on. In some embodiments, the baseline data module 302 receives performance data for each event of each group that is stored in the memory table 108. In another embodiment, the baseline data module 302 receives performance data for predetermined or specific events. For example, the baseline data module 302 may only be interested in performance data for an event that counts the number of processor clock cycles from Group 0 and an event that counts the number of 32 MHz processor clock cycles from Group 2.

In a further embodiment, the baseline data module 302 may configure which performance data to receive by specifying a group, an event, a processor 112, a processor core, an operating system 104, an application identifier (e.g., a process ID), a logical partition, or the like. For example, the baseline data module 302 may receive performance data for a processor clock cycle event associated with a particular operating system 104 and/or application 106a-n and a particular processor 112 or processor core on the computing device 102.

The update data module 304, in one embodiment, is configured to receive a second set of performance data associated with a processor 112 a predefined time interval after the first set of performance data is received. In a further embodiment, the second set of performance data corresponds to the first set of performance data. For example, if the baseline data module 302 receives a first set of performance data that includes data for an event that counts the number of processor clock cycles from Group 0 and an event that counts the number of 32 MHz processor clock cycles from Group 2, the update data module 304 receives a second set of performance data that includes data for an event that counts the number of processor clock cycles from Group 0 and an event that counts the number of 32 MHz processor clock cycles from Group 2 a predefined time interval after the first set of performance data is received.

The second set of performance data may include updated performance data—performance data that has been modified, updated, changed, or the like during the predefined time interval. For example, the performance data for an event that counts the number of processor clock cycles may have changed from 2 million clock cycles to 5.2 million clock cycles within one second. In some embodiments, the predefined time interval may be configured or defined by a user (such as a system administrator), an operating system 104, an application 106a-n, or the like. The predefined time interval may be on the order of microseconds, milliseconds, seconds, or the like. For example, the update data module 304 may receive the second set of performance data 256 microseconds after the baseline data module 302 receives the first set of performance data.

In one embodiment, the rate module 306 is configured to calculate a clock rate for the processor 112 based on the first set and the second set of performance data received by the baseline data module 302 and the update data module 304, respectively. As described in more detail below, the rate module 306 determines the clock rate of the processor 112 based on differences between one or more processor events of the first and second sets of performance data captured by the performance metric capture device 110.

Traditionally, a processor's clock rate is computed based on performance data obtained by a performance monitoring facility in hardware. This facility, however, generally needs to be configured by a software application that intends to consume the performance data, such as an operating system 104, an application 106a-n, a hypervisor 208, or the like. As a result, software or application layer support is required to maintain and configure the performance monitoring facility, which adds overhead and consumes processor clock cycles. In other words, traditional methods for capturing performance metrics and calculating the clock rate for a processor 112 require intervention from a user, an operating system 104, an application 106a-n, and/or any other application layer entity.

In addition to performance overhead, traditional methods for capturing performance metrics and calculating the clock rate for a processor 112 cause interrupt interference due to the frequent interrupt messages or signals that are sent on behalf of the performance monitoring facility. This may compromise execution of the entities at the application layer, such as an operating system 104 or an application 106a-n, by causing the entities at the application layer to service the interrupt notifications.

In order to compensate for the frequency of the monitoring interruptions, traditional methods for capturing performance metrics and calculating the clock rate for a processor 112 measure performance data at larger timing intervals on the order of hundreds of milliseconds or seconds. While this may reduce the amount of monitoring interruptions serviced at the application layer, sampling performance data at increased timing intervals causes the performance data to improperly characterize the processor workload because the clock rate can vary during the interval.

Unlike traditional methods, the subject matter disclosed herein describes capturing performance metrics and calculating the clock rate for a processor 112 using a performance metric capture device 110 that is "always-on," meaning that the performance metric capture device 110 is activated when the processor 112 and/or the computing device 102 is powered on. As a result, performance data for the processor 112 is constantly being monitored and collected from the time that the computing device 102 is powered on until the computing device 102 is powered off. By virtue of being "always-on," the performance metric capture device 110 does not require being configured by a user, an operating system 104, an application 106a-n, a hypervisor 208, and/or any other application layer entity before it can begin monitoring or capturing performance data. Consequently, entities at the application layer, such as an operating system 104 and/or an application 106a-n, can consume data generated and stored by the performance metric capture device 110 to compute the clock rate for the processor 112 without intervening in the configuration of the performance metric capture device 110.

Thus, the subject matter disclosed herein for calculating the clock rate of a processor 112 is non-intrusive, meaning that it does not require users or entities at the application layer to configure the performance metric capture device 110. Accordingly, by removing the user and/or entities at the application layer from the configuration of the performance metric capture device 110, the reliability of the performance metric capture device 110 and/or the application layer entities is increased because configuration errors or other issues can be eliminated. Moreover, the resulting processor clock rate computation is more accurate because the performance data is captured by the performance metric capture device 110 on the order of at least microseconds, instead of on the order of hundreds of milliseconds or more. More accurate clock rate computations can solve many "elastic clocking" issues faced by applications that perform chargeback, accounting, and performance assessments.

Figure 4:
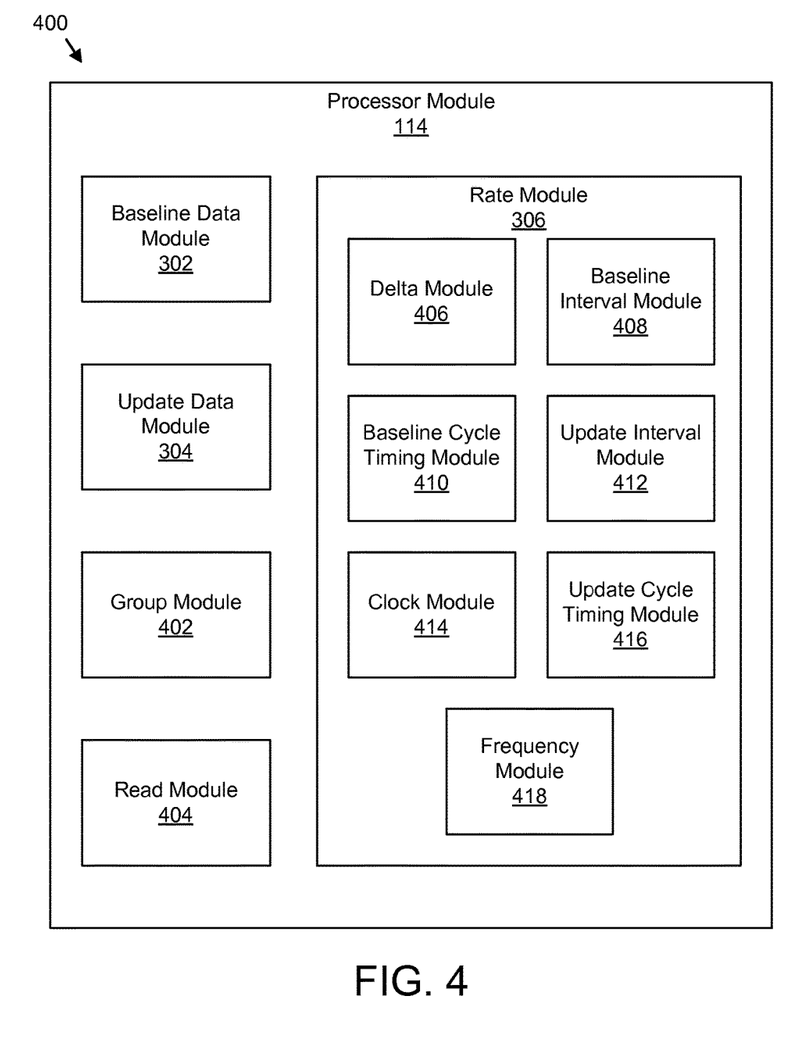
FIG. 4 is a schematic block diagram illustrating one embodiment of another module for calculating a clock frequency of a processor.

FIG. 4 depicts one embodiment of another module 400 for calculating a clock frequency of a processor 112. The module 400, in certain embodiments, includes an embodiment of a processor module 114. The processor module 114 may include one or more of a baseline data module 302, an update data module 304, and a rate module 306, which may be substantially similar to the baseline data module 302, the update data module 304, and the rate module 306 described above. The processor module 114 may also include one or more of a group module 402, a read module 404, a delta module 406, a baseline interval module 408, a baseline cycle timing module 410, an update interval module 412, a clock module 414, a update cycle timing module 416, and a frequency module 418, which are described in more detail below.

The group module 402, in one embodiment, is configured to determine one or more groups of the performance data that include one or more events associated with calculating the clock rate of the processor 112. As described above, the performance data may be divided into a plurality of groups, with each group including data for one or more processor events. Moreover, each group may be identified with a group identifier. For example, Group 0 may include data for a group of events such as the percentage of time the processor 112 was busy during a sampling interval, the percentage of time a process was running in privileged mode, the number of processor clock cycles performed during the interval, or the like. Similarly, Group 2 may include data for a group of events such as the percentage of time the processor 112 was busy servicing a specific process, the percentage of time the process was running in user mode, the number of 32 MHz cycles that were performed during an interval, or the like.

Accordingly, the group module 402 may provide an event identifier, or the like to determine which groups include data for particular events that the rate module 306 uses to calculate the clock rate of the processor 112 for a specified time interval. For example, the groups of performance data may be identified using a hash table, a lookup table, or the like and the group module 402 may provide an event identifier as a key into the lookup table to determine which group the performance data for the event belongs to.

The read module 404, in one embodiment, is configured to read the performance data from a memory table 108. The read module 404 may be used by the baseline data module 302 and the update data module 304 to receive performance data from the memory table 108. In certain embodiments, the memory table 108 may include computer memory in the form of one or more registers (a small amount of storage associated with the processor 112 that can be accessed faster than other memory types), caches, RAM, etc., that store performance data, and the read module 404 may read the performance data from the registers. The read module 404, in another embodiment, may read performance data from the memory table 108 using one or more counters and a counter identifier. For example, the read module 404 may specify a counter identifier such as GROUP_PCYC, which may specify the counter for the processor clock cycles event, or GROUP2_23MHZ_CYC, which may specify the counter for the number of 32 MHz cycles completed during an interval, or the like. The counter identifiers may correspond to the processor event that performance data is being read for. In certain embodiments, if a hypervisor 208 is used to manage one or more logical partitions on the computing device 102, the counters may include hypervisor performance monitoring counters ("HPMC").

In one embodiment, the read module 404 reads performance data from the memory table 108 using an application programming interface ("API"). In certain embodiments, the read module 404 is part of, or otherwise uses, a hypervisor interface or API to read the performance data from the memory table 108. For example, the read module 404 may use a set of functions provided by a memory table 108, a performance metric capture device 110, or a hypervisor 208 to access performance data by providing parameters for group information, event information, processor information, processor core information, logical partition information, application information, operating system information, memory table information, or the like.

In one embodiment, the delta module 406 is configured to determine a difference between the performance data counts between the first set and the second set of performance data during the timing interval for each event of a plurality of events, which may be in the same or separate event groups, used for the calculation of the clock rate for the processor 112. For example, if the number of processor clock cycles for Group 0—GROUP0_PCYC—is used to calculate the processor clock rate, the delta module 406 determines the number of processor clock cycles that occurred during the predefined time interval between when the first set of performance data and the second set of performance data were received by taking the difference between the number of processor clock cycles for the first set of performance data and the number of processor clock cycles for the second set of performance data.

Similarly, if the number of processor clock cycles at a specific clock speed, e.g., 32 MHz, 64 MHz, 128 MHz, 256 MHz, or the like, for Group 2 (denoted GROUP2_32MHZ_CYC for a 32 MHz speed) is used to calculate the processor clock rate, the delta module 406 determines the number of 32 MHz processor clock cycles that occurred during the predefined time interval between when the first set of performance data and the second set of performance data were received by taking the difference between the number of 32 MHz processor clock cycles for the first set of performance data and the number of 32 MHz processor clock cycles for the second set of performance data. In some embodiments, the delta module 406 only calculates differences for specific events that are relevant to calculating the clock rate of the processor 112.

The baseline interval module 408, in one embodiment, is configured to determine a first delta measurement period interval ("MPI") as a function of a first MPI for the first event group, e.g., Group 0 (denoted by meas_period_int_group0), and a second delta MPI as a function of a second MPI for the second event group, e.g., Group 2 (denoted by meas_period_int_group2). As used herein, a measurement period interval is the time interval for each event or each group of events between when performance data for an event or group of events is recorded, generated, captured, stored, tracked, or otherwise collected by the performance metric capture device 110. Accordingly, the delta MPI includes the actual amount of time spent between when the first set of performance data and the second set of performance data are received. Thus, the delta MPI for each group may be calculated by subtracting the MPI for a group within the first set of performance data from the MPI for a corresponding group within the second set of performance data.

The baseline cycle timing module 410, in one embodiment, is configured to determine a time to complete the number of completed cycles at a fixed frequency clock rate as a function of the number of completed cycles at the fixed frequency clock rate and a time to complete one cycle at the fixed frequency clock rate. For example, if the fixed frequency clock rate is 32 MHz, and the time it takes to complete one 32 MHz cycle is $1/(32\times10^6)$ seconds, then the time to complete the number of completed cycles, in seconds, at 32 MHz (denoted by GROUP2_32MHZ_CYC) is:

$$\text{time\_group2\_32mhz\_cyc} = \text{GROUP2\_32MHZ\_CYC} \times 1/(32\times10^6)$$

The update interval module 412 in one embodiment is configured to determine the time it takes to update the second delta measurement period interval by one as a function of the time to complete the number of completed cycles at a fixed frequency clock rate and the second delta measurement period interval. Thus, continuing with the example above that uses a 32 MHz clock speed, the time it takes to update the second delta MPI is:

$$\text{time\_update\_MPI\_group2} = \text{time\_group2\_32mhz\_cyc}/\text{meas\_period\_int\_group2}$$

The clock module 414, in one embodiment, is configured to determine a measurement period interval clock by inverting the time it takes to update the second delta MPI by one. Thus, for a 32 MHz clock speed as the baseline, the measurement period interval clock is:

$$\text{meas\_period\_int\_clock} = 1/\text{time\_update\_MPI\_group2} = \text{meas\_period\_int\_group2}/\text{time\_group2\_32mhz\_cyc}$$

The update cycle timing module 416, in one embodiment, is then configured to determine the time it takes to count the number of processor clock cycles as a function of the MPI clock and the first delta MPI. Accordingly, continuing with the previous example, the time it takes to count the number of processor cycles for group 0 (denoted by GROUP0_PCYC) is:

$$\text{time\_group0\_pcyc} = (1/\text{meas\_period\_int\_clock}) \times \text{meas\_period\_int\_group0}$$

In one embodiment, the frequency module 418 is configured to determine the clock rate for the processor 112 as a function of the number of processor clock cycles and the time to count the number of processor clock cycles. Thus, to conclude the forgoing example, the time spent to count one processor cycle is:

$$\text{proc\_cyc} = \text{time\_group0\_pcyc}/\text{GROUP0\_PCYC},$$

which is the processor clock period. Therefore, the clock rate/frequency for the processor 112 is:

$$\text{clock\_rate} = \text{GROUP0\_PCYC}/\text{time\_group0\_pcyc}.$$

In this manner, the clock rate of the processor 112 can be calculated at a finer timing granularity (e.g., microseconds) using a baseline or reference frequency (e.g., 32 MHz), which improves the accuracy of the clock rate computation, and, ultimately, the accuracy for other performance metrics that are derived from the calculated clock rate.

Furthermore, as described above, the performance data is captured in a non-intrusive manner (e.g., without requiring configuration or communication between the performance metric capture device 110 and application layer entities) to avoid errors or failures associated with configuring the performance metric capture device 110 using an operating system 104, an application 106*a-n*, and/or a hypervisor 208. This can improve the reliability of the operating system 104, or other entities executing at the application layer, during performance data measurements.

Moreover, processor cycles that were normally used by the operating system 104, or another application 106*a-n*, during configuration of the performance metric capture device 110 and/or during data generation can be conserved or used for other processes because the operating system 104 is not required to intervene during configuration of the performance metric capture device 110 and/or during data generation.

In certain embodiments, calculating the clock rate of the processor 112 may be an ongoing process that occurs at predetermined intervals. After the clock rate for the processor 112 has been calculated as described above, for example, the update data module 304 may receive a third set of performance data associated with the processor 112 a predefined time interval after the second set of performance data is received, and the rate module 306 may calculates a second clock rate for the processor 112 based on the second set of performance data and the third set of performance data, and so on.

Figure 5:
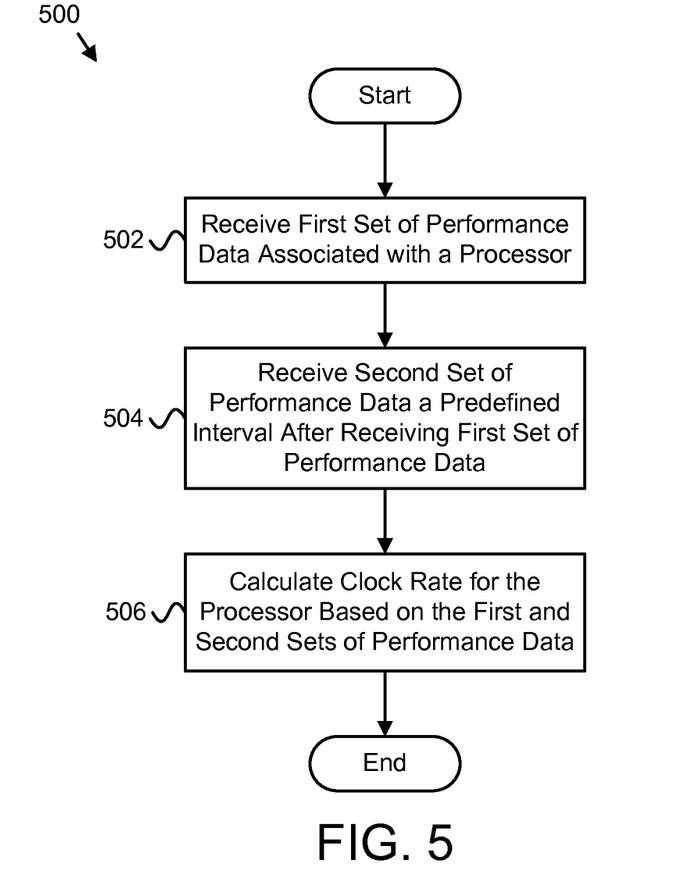
FIG. 5 is a schematic flow chart diagram illustrating one embodiment of a method for calculating a clock frequency of a processor.

FIG. 5 is a schematic flow chart diagram illustrating one embodiment of a method 500 for calculating a clock frequency of a processor 112. In one embodiment, the method 500 begins, and the method 500 receives 502 a first set of performance data associated with a processor 112. In some embodiments, the baseline data module 302 receives 502 the first set of performance data associated with a processor 112. In a further embodiment, the performance data is generated using a hardware element that is external to the processor 112 and captures performance data for the processor 112.

The method 500, in certain embodiments, receives 504 a second set of performance data associated with the processor 112 a predefined time interval after the first set of performance data is received. In one embodiment, the update data module 304 receives 504 the second set of performance data. In some embodiments, the second set of performance data corresponds to the first set of performance data. In one embodiment, the method 500 calculates a clock rate for the processor 112 based on the first set of performance data and the second set of performance data. The rate module 306, in certain embodiments, calculates 506 the processor clock rate, and the method 500 ends.

Figure 6:
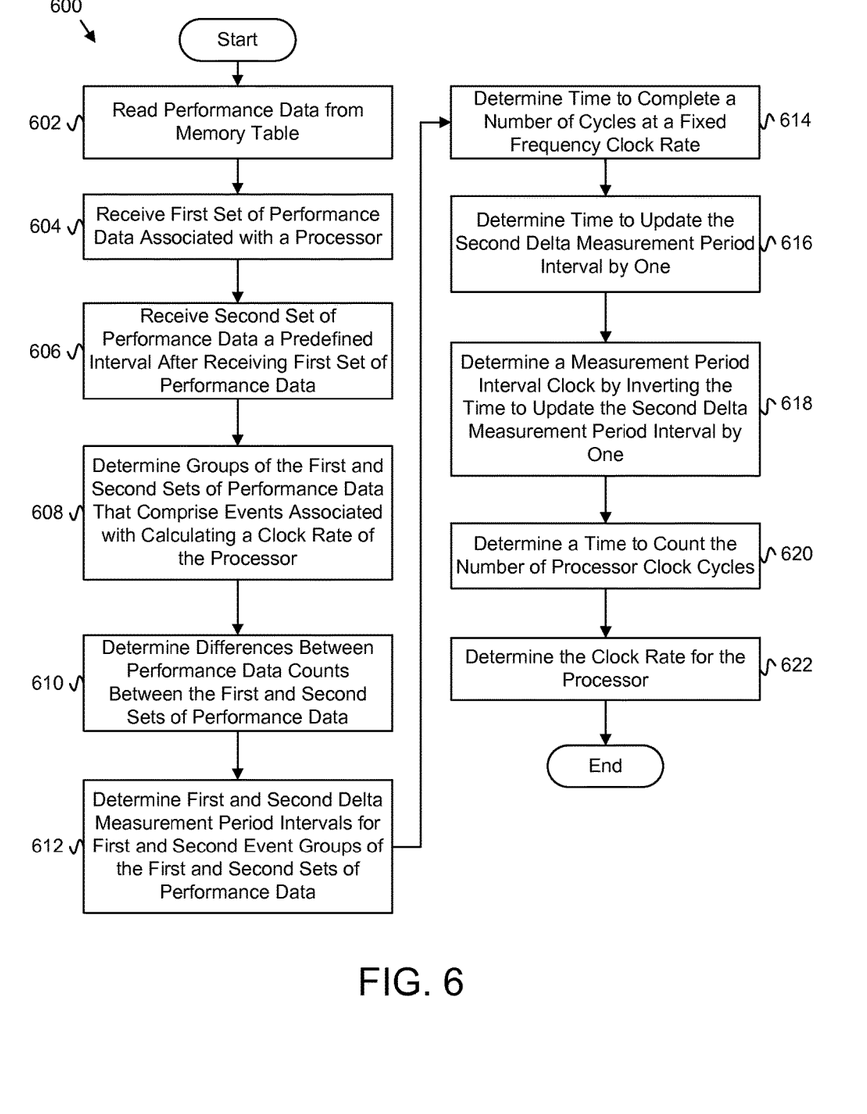
FIG. 6 is a schematic flow chart diagram illustrating one embodiment of another method for calculating a clock frequency of a processor.

FIG. 6 is a schematic flow chart diagram illustrating one embodiment of another method for calculating a clock frequency of a processor 112. In one embodiment, the method 600 begins, and the method 600 reads 602 performance data from a memory table 108. For example, the method 600 may read 602 performance data from one or more counters stored in registers, caches, RAM, or the like. In some embodiments, the read module 404 reads 602 performance data from the memory table 108.

In a further embodiment, the method 600 receives 604 a first set of performance data associated with a processor 112. In some embodiments, the baseline data module 302 receives 604 the first set of performance data associated with a processor 112. In another embodiment, the method 600 receives 606 a second set of performance data associated with the processor 112 a predefined time interval after the first set of performance data is received. In one embodiment, the update data module 304 receives 606 the second set of performance data a predefined time interval after the first set of performance data is received.

In certain embodiments, the method 600 determines 608 one or more groups of the performance data that include one or more events associated with calculating the clock rate of the processor 112. The performance data, as described above, may be divided into a plurality of groups, with each group including data for one or more processor events. In one embodiment, the group module 402 determines 608 one or more groups of the performance data that include one or more events associated with calculating the clock rate of the processor 112.

In various embodiments, the method 600 determines 610 a difference between the performance data counts between the first set and the second set of performance data for a plurality of events. In particular, the plurality of events may include an event for a count of a number of processor clock cycles and an event for a count of a number of completed cycles at a fixed frequency clock rate. The event for the number of processor clock cycles may be located in a first event group and the event for the count for a number of completed cycles at a fixed frequency clock rate may be located in a second event group. In one embodiment, the delta module 406 determines 610 a difference between the performance data counts between the first set and the second set of performance data for a plurality of events.

In certain embodiments, the method 600 determines 612 a first delta measurement period interval as a function of a first measurement period interval for the first event group and a second delta measurement period interval as a function of a second measurement period interval for the second event group. In some embodiments, the baseline interval module 408 determines 612 a first delta measurement period interval as a function of a first measurement period interval for the first event group and a second delta measurement period interval as a function of a second measurement period interval for the second event group.

In a further embodiment, the method 600 determines 614 a time to complete the number of completed cycles at a fixed frequency clock rate, such as 32 MHz, as a function of the number of completed cycles at a fixed frequency clock rate and a time to complete one cycle at the fixed frequency clock rate. In some embodiments, the baseline cycle timing module 410 determines 614 a time to complete the number of completed cycles from a fixed frequency clock rate as a function of the number of completed cycles at a fixed frequency clock rate and a time to complete one cycle at the fixed frequency clock rate.

In one embodiment, the method 600 determines 616 a time to update the second delta measurement period interval by one as a function of the time to complete the number of completed cycles at a fixed frequency clock rate and the second delta measurement period interval. In certain embodiments, the update interval module 412 determines 616 a time to update the second delta measurement period interval by one as a function of the time to complete the number of completed cycles at a fixed frequency clock rate and the second delta measurement period interval.

In another embodiment, the method 600 determines 618 a measurement period interval clock by inverting the time to update the second delta measurement period interval by one. The clock module 414, in some embodiments, determines 618 a measurement period interval clock by inverting the time to update the second delta measurement period interval by one.

The method 600, in a further embodiment, determines 620 a time to count the number of processor clock cycles as a function of the measurement period interval clock and the first delta measurement period interval. In one embodiment, the update cycle timing module 416 determines 620 a time to count the number of processor clock cycles as a function of the measurement period interval clock and the first delta measurement period interval.

In yet another embodiment, the method 600 determines 622 the clock rate for the processor 112 as a function of the number of processor clock cycles and the time to count the number of processor clock cycles. In one embodiment, the frequency module 418 determines 622 the clock rate for the processor 112 as a function of the number of processor clock cycles and the time to count the number of processor clock cycles, and the method 600 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a performance metric capture device that continuously captures performance data for a processor of a device from when the processor begins executing until the processor ceases execution, the performance metric capture device being separate from the processor within the device;
a baseline data module that receives a first set of performance data associated with the processor, the performance data captured by the performance metric capture device;
an update data module that receives a second set of performance data associated with the processor a predefined time interval after the first set of performance data is received, the second set of performance data captured by the performance metric capture device and corresponding to the first set of performance data; and
a rate module that calculates a clock rate for the processor based on the first set of performance data and the second set of performance data, wherein one or more applications executing on the device use the calculated clock rate,
wherein at least a portion of said modules comprise one or more of hardware and executable code, the executable code stored on one or more computer readable storage media.

2. The apparatus of claim 1, wherein the first and second sets of performance data comprise counts for a plurality of different events associated with the processor.

3. The apparatus of claim 2, wherein the plurality of different events are divided into a plurality of groups of events for each of the first and second sets of performance data.

4. The apparatus of claim 3, further comprising a group module that determines one or more groups comprising one or more events associated with calculating the clock rate of the processor.

5. The apparatus of claim 4, further comprising:
a delta module that determines a difference between the performance data counts between the first set and the second set of performance data for a plurality of events, the plurality of events comprising an event for a count of a number of processor clock cycles and an event for a count of a number of completed cycles at a fixed frequency clock rate, the event for the number of processor clock cycles being in a first event group and the event for the count for a number of completed cycles at a fixed frequency clock rate being in a second event group;
a baseline interval module that determines a first delta measurement period interval as a function of a first measurement period interval for the first event group and a second delta measurement period interval as a function of a second measurement period interval for the second event group;
a baseline cycle timing module that determines a time to complete the number of completed cycles at a fixed frequency clock rate as a function of the number of completed cycles at a fixed frequency clock rate and a time to complete one cycle at the fixed frequency clock rate;
an update interval module that determines a time to update the second delta measurement period interval by one as a function of the time to complete the number of completed cycles at a fixed frequency clock rate and the second delta measurement period interval;
a clock module that determines a measurement period interval clock by inverting the time to update the second delta measurement period interval by one;
an update cycle timing module that determines a time to count the number of processor clock cycles as a function of the measurement period interval clock and the first delta measurement period interval; and
a frequency module that determines the clock rate for the processor as a function of the number of processor clock cycles and the time to count the number of processor clock cycles.

6. The apparatus of claim 3, wherein the performance data for each group of the plurality of groups is captured by the performance metric capture device at predetermined time intervals, the predetermined time intervals being at least on an order of microseconds.

7. The apparatus of claim 6, wherein the predetermined time intervals are at least 256 microseconds.

8. The apparatus of claim 1, wherein:
the update data module receives a third set of performance data associated with the processor a predefined time interval after the second set of performance data is received, the third set of performance data corresponding to the second set of performance data; and
the rate module calculates a second clock rate for the processor based on the second set of performance data and the third set of performance data.

9. The apparatus of claim 1, wherein the performance data is captured by the performance metric capture device without intervention by a software application.

10. The apparatus of claim 1, further comprising a read module that reads the performance data associated with the processor from a memory table external to the processor.

11. The apparatus of claim 10, wherein the read module reads the performance data from the memory table using a hypervisor interface, the hypervisor interface associated with a logical partition executing on a computing device.

12. The apparatus of claim 11, wherein the computing device comprises a plurality of logical partitions, each logical partition comprising a separate memory table that stores performance data associated with the logical partition.

13. A method comprising:
receiving a first set of performance data associated with a processor, the performance data captured using a performance metric capture device that continuously captures performance data for the processor of a device from when the processor begins executing until the processor ceases execution, the performance metric capture device being separate from the processor within the device;
receiving a second set of performance data associated with the processor a predefined time interval after the first set of performance data is received, the second set of performance data captured by the performance metric capture device and corresponding to the first set of performance data; and
calculating a clock rate for the processor based on the first set of performance data and the second set of performance data, wherein one or more applications executing on the device use the calculated clock rate.

14. The method of claim 13, wherein the first and second sets of performance data comprise counts for a plurality of different events associated with the processor, the plurality of different events divided into a plurality of groups of events for each of the first and second sets of performance data.

15. The method of claim 14, further comprising determining one or more groups comprising one or more events associated with calculating the clock rate of the processor.

16. The method of claim 15, further comprising:
determining a difference between the performance data counts between the first set and the second set of performance data for a plurality of events, the plurality of events comprising an event for a count of a number of processor clock cycles and an event for a count of a number of completed cycles at a fixed frequency clock rate, the event for the number of processor clock cycles being in a first event group and the event for the count for a number of completed cycles at a fixed frequency clock rate being in a second event group;
determining a first delta measurement period interval as a function of a first measurement period interval for the first event group and a second delta measurement period interval as a function of a second measurement period interval for the second event group;
determining a time to complete the number of completed cycles at a fixed frequency clock rate as a function of the number of completed cycles at a fixed frequency clock rate and a time to complete one cycle at the fixed frequency clock rate;
determining a time to update the second delta measurement period interval by one as a function of the time to complete the number of completed cycles at a fixed frequency clock rate and the second delta measurement period interval;
determining a measurement period interval clock by inverting the time to update the second delta measurement period interval by one;
determining a time to count the number of processor clock cycles as a function of the measurement period interval clock and the first delta measurement period interval; and
determining the clock rate for the processor as a function of the number of processor clock cycles and the time to count the number of processor clock cycles.

17. The method of claim 14, wherein the performance data for each group of the plurality of groups is captured by the performance metric capture device at predetermined time intervals, the predetermined time intervals being at least 256 microseconds.

18. The method of claim 13, wherein the performance data is captured by the performance metric capture device without intervention by a software application.

19. The method of claim 13, further comprising reading performance data associated with the processor from a memory table external to the processor using a hypervisor interface, the hypervisor interface associated with a logical partition executing on a computing device.

20. A computer program product comprising a computer readable storage medium having program instructions embodied therewith, the program instructions readable/executable by a processor to cause the processor to:
receive, by processor, a first set of performance data associated with a processor, the performance data captured using a performance metric capture device that continuously captures performance data for the processor of a device from when the processor begins executing until the processor ceases execution, the performance metric capture device being separate from the processor within the device;
receive, by processor, a second set of performance data associated with the processor a predefined time interval after the first set of performance data is received, the second set of performance data captured by the performance metric capture device and corresponding to the first set of performance data; and
calculate, by processor, a clock rate for the processor based on the first set of performance data and the second set of performance data, wherein one or more applications executing on the device use the calculated clock rate.

* * * * *